Oct. 27, 1953

H. RAVIN 2,656,628

LUMINOUS INDICIA DIAL FOR TELEPHONES

Filed Feb. 17, 1951

Inventor:
Harry Ravin.
By Harold J. LeVesconte
Atty.

Patented Oct. 27, 1953

2,656,628

UNITED STATES PATENT OFFICE 2,656,628

LUMINOUS INDICIA DIAL FOR TELEPHONES

Harry Ravin, Burbank, Calif.

Application February 17, 1951, Serial No. 211,451

8 Claims. (Cl. 40—10.5)

Figures 1, 2, 3, 4, 5, 6, 7, 8:
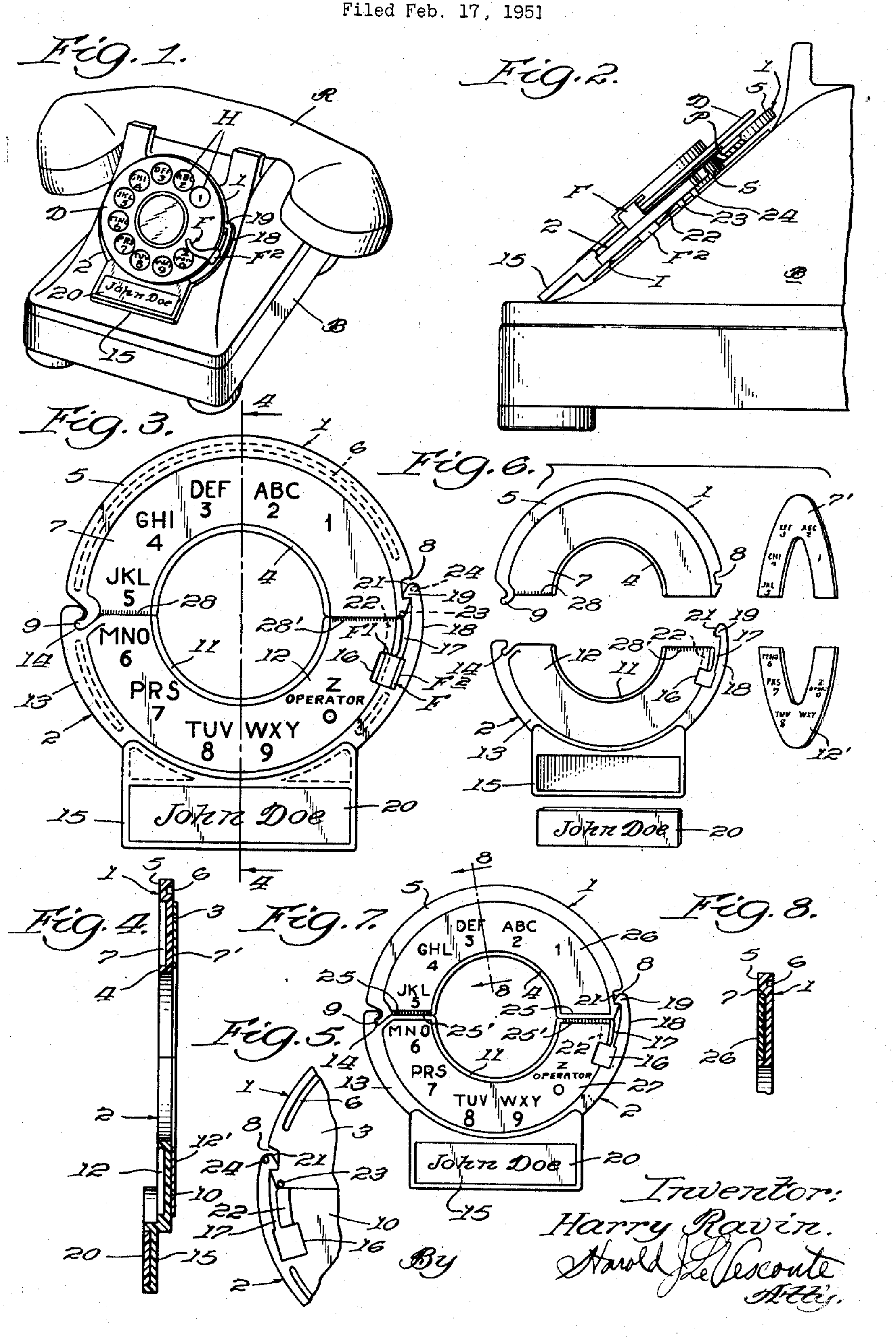

This invention relates to luminous dial indicia for dial telephones and particularly to an improved form thereof adapted for installation on telephone instruments in which the indicia bearing component is substantially flush with the surface of the instrument as, for instance, in the case of the so-called "cradle" type of instrument.

Numerous attempts have been made in the past to provide telephone instruments with luminous dial indicia to permit use of the instrument in dark and in poorly lighted locations, but most, if not all of the prior devices require additional fastening means, or have been designed for prior art telephone instruments in which the indicia bearing surface was disposed on the end of a shallow cylindrical case which projected some distance above the surface of the instrument base and use was made of the side surface of the case as a part of the means for securing the dial in place. Other attempts to provide luminous dial indicia for telephones have resulted in devices which can only be installed at the time the instrument is manufactured.

With the foregoing considerations in mind, it is an object of the present invention to provide a luminous dial indicia assembly for cradle type telephone instruments having the indicia dial thereof disposed substantially flush with the adjacent surface of the instrument which is so constructed and arranged that it can be installed without the use of any tools or special fastener parts, which does not require the disassembly of the instrument.

Another object of the invention is to provide a luminous dial indicia assembly for cradle type telephones composed of two interlocking parts including a resilient, integral latch element and a clearance space for the finger stop element of the telephone instrument and in which said clearance space serves to give the latch element the required length to permit it to function in the desired manner.

A further object of the invention is to provide a luminous dial indicia attachment for telephone instruments which is so constructed and arranged that the indicia carried thereby may be placed on the upper surfaces of the dial components and covered by a lens or in which said indicia may be placed on the under side of the dial components as may be found desirable to suit customer preference.

Still another object of the invention is to provide a luminous dial indicia means for telephone instruments which is primarily composed of a pair of plastic moldings so constructed and arranged as to be interlocked about the shoulder at the inner perimeter of the instrument indicia dial and to be held in registry therewith by engagement with the finger stop of the instrument.

With the foregoing objects in view, together with such other objects and advantages as may subsequently appear, the invention resides in the parts, and in the construction, combination, and arrangement of parts described, by way of example in the following specification of certain modes of execution of the invention; reference being had to the accompanying drawings which form a part of said specification and in which drawings:

Fig. 1 is a front perspective view of a telephone instrument showing the invention applied thereto.

Fig. 2 is an enlarged, fragmentary side elevation of Fig. 1; a portion of one of the components of the invention being broken away for clearness of illustration, Fig. 3 is a further enlarged front elevation of one embodiment of the invention; the vertical shank portion of the finger stop of the telephone instrument being shown in section, Fig. 4 is a transverse sectional view taken on the line 4—4 of Fig. 3, Fig. 5 is a fragmentary bottom plan view of the invention showing details of the interlocking means, Fig. 6 is an exploded view of the component parts of the first disclosed form of the invention, Fig. 7 is a front plan view of a second embodiment of the invention, and Fig. 8 is an enlarged, fragmentary sectional view taken on the line 8—8 of Fig. 7.

Referring to the drawings, the invention is shown applied to a telephone instrument comprising a base B, a receiver and transmitter unit R, a manually operable selector dial D and a finger stop element F effective to limit the extent to which the dial may be rotated from any of the finger holes H therein. Beneath and spaced from the dial D is an indicia carrying member I surrounding a sleeve S projecting outwardly from the base of the instrument and terminating in an outturned flange portion P spaced a short distance above the outer face of the indicia carrying dial I; the latter having sets of letters and numbers which are observable through and identify the various finger holes in the rotatable selector dial D.

The form of the invention shown in Figs. 3, 4, 5 and 6 comprises two axially thin, semicircular members 1 and 2 which interlock in the manner to be later described in detail to form a washer-like split ring element adapted to overlie the indicia carrying member I and to closely engage the sleeve S with the inner edge of the disc fitting between the opposed surfaces of the member I and the flange portion P of the sleeve S (see Fig. 2). The members are preferably formed of moldings of transparent plastic, and as shown in Fig. 4, the member 1 has a flat rear face portion 3, an inner rib 4 adapted to be engaged between the opposed faces of the indicia carrying member I and the flange P and an equally thick outer peripheral rib 5 which on the under side thereof is formed with a substantially co-extensive groove 6 to maintain as far as possible a uniform cross section thickness to facilitate molding procedures. Between the ribs 4 and 5, the member I is reduced in thickness from the outer face with resultant formation of a wide shallow groove 7 extending from end to end of the member. At the end thereof which is adjacent the finger stop F of the instrument, the rib 5 is provided with a latch receiving notch 8 adapted to be engaged by a latch element carried by the member 2 in a manner to be later described in detail, and at its other end, the rib 5 extends first inwardly into the groove 7 and thence outwardly beyond and at an acute angle to the meeting end faces of the members 1 and 2 to form a tongue portion 9 adapted for interengagement with a complementary notch formed in the member 2 as will also be later described in detail.

The member 2 is formed with a rear face 10 coplanar with the face 3 of the member 1, and an inner rib 11 and a wide shallow groove 12 which are complementary to the rib 4 and groove 7 and combine therewith to form complete circles (see Fig. 3). The outer rib 13 at one end to end is formed with a notch 14 at one end to interlockingly engage the tongue portion 9 of the member 1 and at its mid point it may be interrupted by a name tab element 15 adapted to carry the name of an advertiser or other matter, or the rib may continue along the edge of the member 2 to the point of engagement with the finger stop element F of the telephone instrument as the manufacturer may desire. The finger stop element extends through the indicia carrying member I, thence radially outwardly in close adjacency thereto in a run F1 to a point radially beyond the edge of the dial D, thence upwardly in a run F2 to a point above the plane of the dial D and thence inwardly parallel to the outer face of the dial to form the finger stop. The member 2 is provided with a rectangular opening 16 adapted to extend around the run F1 of the finger stop and with a slot 17 extending parallel to the outer edge of the member from the opening 16 to the adjacent end of the member adapted to allow the run F2 of the finger stop to traverse the slot incident to placement of the member 2 on an instrument. The outer edge portion of the member 2 extends from the opening 16 to a point beyond the adjacent end of the groove 12 and forms an integral, resilient latch element 18 terminating in an inwardly extending detent 19 adapted to engage the notch 8 formed in the edge of the member 1. The flat rear faces 3 and 10 of the members 1 and 2 opposite the shallow grooves 7 and 12 are covered by decalcomania transfers 7′ and 12′ carrying indicia identical with that carried by the element I but with the characters thereof formed of luminous material so that the indicia can be read in the dark. The name tab portion 15 may be formed with a shallow recess adapted to contain printed matter which may be in the form of a card inserted therein or the matter may be printed directly on the bottom of the recess by an appropriate process and the recess then filled by a transparent lens portion 20 cemented or otherwise secured therein. Alternatively the printing may be performed in reverse on the back of the recess or on the back of the lens element.

To install the invention on a telephone instrument, the member 1 is first inserted between the dial and the indicia carrying member from the side thereof and is then rotated into position about the sleeve S until it is approximately over the upper half of the member I. The member 2 is then inserted between the dial and member I with the notch 14 thereof engaging the end of the tongue 9 on the member 1 and is pivoted about that point of engagement as it is swung toward its final position. At it is thus swung into position the rounded inner face 21 of the latch element 18 engages the edge of the run F2 of the finger stop and springs outwardly past it bringing the run F2 into the slot 17 and continued movement of the member 2 will bring the opening 16 into registry with the run F1 of the finger stop, at which time the latch element has ridden over the end of the rib 5 on the member 1 until the detent 19 thereof has snapped into the notch 8 locking the members together in the manner shown in Fig. 3. The member 2 additionally carries a detent member 22 extending from the edge of the opening 16 to the adjacent end of the member and gradually increasing in thickness from the end of the member to its termination at the opening 16. As the member 2 is swung into position as above described, this detent rides up over the outer face of the finger stop run F1 and then snaps down back of the finger stop (see Fig. 2) to prevent retrograde movement of the members; the bias for such "snap-in" action being provided by the engagement of the ribs 4 and 11 with the flange P and the member I. The tongue 9 and the complementary notch 14 are so proportioned that the side of the tongue and the corresponding side of the notch are brought into engagement with each other just prior to the interengagement of the opposite ends of the members 1 and 2 and the interengagement of the detent 19 with the notch 8 thus providing a bias tending to separate the members at the point of engagement by the latch to stiffen the assembly. To remove the device from the instrument, the edge of the member 2 adjacent the latch is lifted away from the member 1 until the detent 19 is clear of the notch 8 and the detent 22 is above the plane of the run F1, after which, the member 2 is swung outwardly away from between the dial D and member I; the latch 18 being sprung outwardly momentarily to allow the detent 19 to clear the run F2 of the finger stop. Upon removal of the member 2, the member 1 is free to be removed. To prevent disengagement of the latch means by downward pressure on either of the members 1 and 2, the member 1 is provided with a downwardly extending boss 23 and the free end of the latch carries a corresponding boss 24; both of which bosses are adapted to engage the surface of the instrument base as shown in Fig. 2 to support the edges of the members against movement toward the instrument.

Referring to the form of the invention shown in Figs. 7 and 8, the mode of interlocking and attachment to an instrument are the same as in the first described form and need not be repeated. In these figures, all identical parts have been given the same identifying numbers as in the first described form. This second form of the invention is adapted to the use of opaque plastics and the shallow front grooves 7 and 12 therein are enclosed by end walls 25 and 25'. Mounted in the groove 7 is a semicircular lens element 26 formed of transparent plastic having the indicia characters formed in reverse on the under side thereof; the character forming grooves being filled with a luminous paint substance and the whole underside of the lens element being then covered with a paint of the same color as the plastic forming the members 1 and 2. The groove 12 in the member 2 is similarly filled with a lens element 27 having the remainder of the indicia similarly applied thereto. This form of the invention is preferable where a less conspicuous form of the invention is desired or where a more permanent type of lettering is advisable such as outdoor locations or places subject to excessive moisture or humidity sufficient to adversely affect the decalcomania type of characters first described. While having these advantages, it is also more expensive to manufacture and consequently, these two forms of the invention provide a cheaper form of the invention suitable for most locations and a higher quality form thereof adapted for situations where the cheaper form might be unsatisfactory.

In both forms of the invention, at the meeting end portions of the members 1 and 2, the end of the member toward which the finger of a user moves in operating the instrument dial is tapered slightly below the plane of the surface contacted by the finger of the user. The extreme amount of this taper at the point of juncture with the end of the other member is very slight; being of the order of a few thousandths of an inch and is indicated at 28 at the left hand end of the member 1 and by 28' at the right hand end of the member 2 as viewed in Figs. 3, 6 and 8. Since the manual operation of the instrument dial is only in a clockwise direction, this expedient of providing a slight offset at the joints between the members 1 and 2 in the direction of manual movement of the instrument dial precludes any chance that the fingernail of a user will be scratched or broken incident to passing over those joints.

While I have illustrated and described certain embodiments of my invention, I do not intend thereby to limit myself to the exact forms above disclosed since modifications will suggest themselves to those skilled in the art in the light of the foregoing disclosure. With these considerations in mind, the invention is intended to embrace not only the disclosed embodiments thereof, but also all such modifications in the parts, and in the construction, combination and arrangement of parts as shall come within the purview of the appended claims.

I claim:

1. A luminous dial indicia means for dial type telephone instruments comprising a pair of semicircular, axially thin components adapted to combine to form a flat, split ring element for installation beneath the selector dial of the instrument and having luminous indicia observable through the finger holes of the selector dial; said components at one pair of meeting ends thereof having interengaging, hinge action permitting means, one of said components at its other end having a detent receiving notch disposed in the outer edge thereof and the other of said components at its corresponding other end having a slot terminating in an opening for reception of the finger stop of the instrument; the portion of said other component at the outside of said slot and said opening extending beyond the end of said other component and serving as an integrally formed resilient latch element terminating in a detent engaging said notch in holding said components in assembly on the instrument.

2. A luminous dial indicia means for dial type telephone instruments comprising a pair of semicircular, axially thin components adapted to combine to form a flat, split ring element for installation beneath the selector dial of the instrument and having luminous indicia observable through the finger holes of the selector dial; said components at one pair of meeting ends thereof having interengaging, hinge action permitting means, one of said components at its other end having a detent receiving notch disposed in the outer edge thereof and the other of said components at its corresponding other end having a slot terminating in an opening for reception of the finger stop of the instrument; the portion of said other component at the outside of said slot and said opening extending beyond the end of said other component and serving as an integrally formed resilient latch element terminating in a detent engaging said notch and holding said components in assembly on the instrument; said hinge action permitting means being constructed and arranged to permit free relative movement between said components and to apply a bias tending to separate said components at the latch ends thereof just prior to engagement of said notch by said detent.

3. A luminous dial indicia means for dial type telephone instruments comprising a pair of semicircular, axially thin components adapted to be interengaged in end to end relation to form a flat, split ring element disposed beneath the selector dial of the instrument and having luminous indicia on the exposed side thereof arranged for observation through the finger holes of the selector dial; the inner peripheral edge surface of said element engaging and being positioned by a sleeve element forming a part of and extending outwardly of the indicia plate of the instrument; said components at one pair of meeting ends thereof having interengaging, hinge action permitting means, one of said components at its other end having a detent receiving notch disposed in the outer edge thereof and the other of said components at its corresponding other end having a slot terminating in an opening for reception of the finger stop of the instrument; the portion of said other component at the outside of said slot and said opening extending beyond the end of said other component and serving as an integrally formed resilient latch element terminating in a detent engaging said notch and holding said components in assembly on the instrument.

4. A luminous dial indicia means for dial type telephone instruments comprising a pair of semicircular, axially thin components adapted to be interengaged in end to end relation to form a flat, split ring element disposed beneath the selector dial of the instrument and having luminous indicia on the exposed side thereof arranged for observation through the finger holes of the selector dial; the inner peripheral edge surface of said element engaging and being positioned by a sleeve element forming a part of and extending outwardly of the indicia plate of the instrument; said components at one pair of meeting ends thereof having interengaging, hinge action permitting means, one of said components at its other end having a detent receiving notch and the other of said components at its corresponding other end having a slot terminating in an opening for reception of the finger stop of the instrument; the portion of said other component at the outside of said slot and said opening extending beyond the end of said other component and serving as an integrally formed resilient latch element terminating in a detent engaging said notch and holding said components in assembly on the instrument; said hinge action permitting means being constructed and arranged to permit free relative movement between said components and to apply a bias tending to separate said components at the latch ends thereof just prior to engagement of said notch by said detent.

5. A luminous dial indicia means for dial type telephone instruments comprising a pair of semicircular, axially thin components interengageable in end to end relation to form a flat, split ring element disposed beneath the selector dial of the instrument and having luminous indicia on the exposed side thereof arranged for observation through the finger holes of the selector dial; the inner peripheral edge surface of said element engaging and being positioned by a sleeve element forming a part of and extending outwardly of the indicia plate of the instrument; one of said components at one end thereof having an integral tongue portion extending diagonally outwardly beyond said end and having a notch in its outer edge adjacent the other end thereof and the other of said components having a notch in an end thereof engageable with said tongue and at its other end having an integrally formed resilient latch member extending beyond said other end and terminating in a detent yieldable to ride up over said outer edge of said one component and to enter said notch in said outer edge of said one component; a portion of said latch element being laterally spaced from the edge of said other component with resultant formation of a finger stop hook receiving recess.

6. A luminous dial indicia means for dial type telephone instruments comprising a pair of semicircular, axially thin components interengageable to form a flat, split ring element for installation beneath the selector dial of the instrument and having luminous indicia observable through the finger holes of the selector dial; one of said components at one end thereof having an integral tongue portion extending diagonally outwardly beyond said end and having a notch in its outer edge adjacent the other end thereof and the other of said components having a notch in an end thereof engageable with said tongue and at its other end having an integrally formed resilient latch member extending beyond said other end and terminating in a detent yieldable to ride up over said outer edge of said one component and to enter said notch in said outer edge of said one component; a portion of said latch element being laterally spaced from the edge of said other component with resultant formation of a finger stop hook receiving recess; the engagement of said recess with the finger stop hook serving to secure said indicia means against rotation on the instrument.

7. A luminous dial indicia means for dial type telephone instruments comprising a pair of semicircular, axially thin components interengageable in end to end relation to form a flat, split ring element disposed beneath the selector dial of the instrument and having luminous indicia on the exposed side thereof arranged for observation through the finger holes of the selector dial; the inner peripherial edge surface of said element engaging and being positioned by a sleeve element forming a part of and extending outwardly of the indicia plate of the instrument; one of said components at one end thereof having an integral tongue portion extending diagonally outwardly beyond said end and having a notch in its outer edge adjacent the other end thereof and the other of said components having a notch in an end thereof engageable with said tongue and adjacent its other end having an opening therethrough for reception of the finger stop of the instrument, a slot extending from said opening to the adjacent end of said other component, and a resilient latch element formed integrally with said other component; said latch forming one side of said slot and said opening and including a detent engaging said notch in said outer edge of said one component.

8. A luminous dial indicia means for dial type telephone instruments comprising a pair of semi-circular axially thin, components interengageable to form a flat, split ring element for installation beneath the selector dial of the instrument and having luminous indicia observable through the finger holes of the selector dial; one of said components at one end thereof having an integral tongue portion extending diagonally outwardly beyond said end and having a notch in its outer edge adjacent the other end thereof and the other of said components having a notch in an end thereof adapted to engage and receive said tongue and adjacent its other end having an opening therethrough for reception of the finger stop of the instrument, a slot extending from said opening to the adjacent end of said other component, and a resilient latch element formed integrally with said other component; said latch forming one side of said slot and said opening extending outside of and past the finger stop and terminating in a detent engaging said notch in said outer edge of said one component.

HARRY RAVIN.

References Cited in the file of this patent

UNITED STATES PATENTS

| Number | Name | Date |
|---|---|---|
| 1,553,856 | Garrett | Sept. 15, 1925 |
| 1,860,606 | Carroll | May 31, 1932 |
| 2,433,366 | Hersey | Dec. 30, 1947 |
| 2,509,833 | Miller | May 30, 1950 |
| 2,558,585 | Sandor | June 26, 1951 |